United States Patent [19]

Ogino et al.

[11] Patent Number: 5,412,437
[45] Date of Patent: May 2, 1995

[54] PROJECTION TYPE DISPLAY DEVICE

[75] Inventors: Masanori Ogino, Yokohama; Yoshiaki Iwahara, Yokosuka; Syuichi Sakamoto, Yokohama, all of Japan

[73] Assignee: Hitachi, Ltd., Tokyo, Japan

[21] Appl. No.: 86,095

[22] Filed: Jul. 6, 1993

[30] Foreign Application Priority Data

Jul. 6, 1992 [JP] Japan .................................. 4-178425

[51] Int. Cl.⁶ .............................................. H04N 5/74
[52] U.S. Cl. ......................................... 348/781; 348/786;
348/834; 359/601; 313/478
[58] Field of Search ................ 358/230, 231, 237, 238,
358/239, 60, 64, 250, 252, 253; H04N 5/74,
9/31; 359/649, 651, 665, 601, 608, 614; 313/36,
44, 478; 348/744, 776, 777, 778, 779, 783, 784

[56] References Cited

U.S. PATENT DOCUMENTS 4,777,532 10/1988 Hasegawa ........................ 358/231

FOREIGN PATENT DOCUMENTS 0179178 7/1990 Japan .............................. H04N 5/74
0102747 4/1991 Japan .................................. 358/231
4207487 7/1992 Japan .............................. H04N 5/74

Primary Examiner—James J. Groody
Assistant Examiner—Michael H. Lee
Attorney, Agent, or Firm—Antonelli, Terry, Stout & Kraus

[57] ABSTRACT

A projection type display device including a CRT with a fluorescent layer and a face glass for projecting an image reflected onto the fluorescent layer through the face glass, a transparent liquid, at least one lens element and onto a screen. The transparent liquid is filled within a space between the face glass of the CRT and the at least one lens element and has a refractive index substantially the same as a refractive index of the face glass of the CRT and the at least one lens element. A light attenuation filter having a transmittance no greater than 0.9 is disposed at a position from the fluorescent layer to the at least one lens element such as between the face glass and the at least one lens element.

21 Claims, 3 Drawing Sheets

PROJECTION TYPE DISPLAY DEVICE

The present invention relates to a projection type display device, particularly to a display device having an improved contrast ratio.

BACKGROUND OF THE INVENTION

In a projection type display device, as one technique to improve the contrast ratio of a projected image on a screen, technology has been already proposed in that a transparent liquid having the same refractive index as that of a face glass of a CRT (cathode ray tube) and a lens is filled in a space between the CRT and a lens element to enlarge its reflected image, and light reflection in such a face glass or lens is eliminated. Such technology in the prior art will be described referring to FIG. 5 which shows a CRT 1, a fluorescent layer 2, a face glass 3 of the CRT 1, lens elements 4,5, a liquid container 6, a liquid sealing O-ring 7, a transparent liquid 8, and a screen 9.

In FIG. 5, the liquid container 6 having a circular or rectangular cylinder shape is installed between the face glass 3 of the CRT 1 and the lens element 5 having a collar on the outer circumference so that the face glass 3, the lens element 5 and the liquid container 6 constitute a space. This space is sealed by the O-ring 7, and the transparent liquid 8 is charged within the sealed space. In this case, the face glass 3 and the lens element 5 are nearly equal in refractive index, and the refractive index of the transparent liquid 8 is selected to be a value of about 1.4–1.6 which is close to, i.e., substantially equal to, the refractive index that of the face glass 3 and the lens element 5. According to such arrangement, light emitted from the fluorescent layer 2 of the CRT 1 passes through the face glass 3, the transparent liquid layer 8, the lens elements 5, 4 and arrives at the screen 9, and an image reflected to the fluorescent layer 2 is enlarged and then projected and displayed on the screen 9. Since the refractive index of the transparent liquid layer 8 is nearly equal to that of the face glass 3 or the lens element 5, the light emitted from the fluorescent layer 2 is prevented from being reflected on the exit side surface of the face glass 3 contacting the transparent liquid layer 8 (surface at the side of the screen 9) or the incidence side surface of the lens element 5 contacting the transparent liquid layer 8 (surface at the side of the CRT 1). Consequently, useless light on the screen 9 produced due to such reflection is reduced and the contrast ratio is improved.

However, the contrast ratio which can be attained by such prior art is restricted to about 100 to 1. Therefore, a problem exists in that a portion of the image which is originally black in the reproduced image on the screen 9 becomes gray, and decipherability of the black figure is deteriorated. Also when the reproduced image is a color image, a problem exists in that color purity is deteriorated. Such problems will be described referring to FIG. 5. In FIG. 5, regarding light emitted from a peripheral part P1 of the fluorescent layer 2 to which an image is reflected, some portion of this light is directed to the center of the lens element 5, but depending on the position of the peripheral part P1, since the lens element 5 is a curved surface and the lens element 5 and air are different from each other in refractive index, the light directed to the center is subjected to total reflection at the center of the exit side surface of the lens element 5 and returned to a peripheral part P2 of the fluorescent layer 2. If such a light exists, this light causes the peripheral part P2 to emit a light, which arrives at the screen 9 as above described. In such manner, if unrequired light (hereinafter referred to as "useless light") strikes the screen 9, the contrast ratio of the display image on the screen will be deteriorated.

A light emitted from a position P3, which is not at a peripheral part of the fluorescent layer 2, is not subjected to total reflection at the center of the lens element 5, but may be subjected to total reflection at a peripheral part of the lens element, and a light subjected to the total reflection at the peripheral part is further reflected at another part, for example, an inner wall of the liquid container 6, and returned to position P4 of the fluorescent layer 2 again. Also in this case, a light is emitted at the position P4, and the emitted light becomes useless light on the screen 9.

Further although not shown in FIG. 5, a light emitted from the fluorescent layer 2 may be diffused and reflected at the inner wall of the liquid container 6 and returned to the fluorescent layer 2 again, so that the contrast ratio may be deteriorated. Also, although not shown in FIG. 5, the lens element 4 is surrounded by a cylindrical mount separately so that the external light from the surrounding illumination source is prevented from entering from the face glass 3 into the CRT 1 to the minimum.

SUMMARY OF THE INVENTION

An object of the present invention is to provide a projection type display device which solves the aforementioned problems, enables significant reduction of the reflected light in the lens elements, and further enables increase of the contrast ratio.

In accordance with a feature of the present invention, a projection type display device having a CRT with a fluorescent layer and a face glass, lens elements and a screen, and having a transparent liquid layer filling the space between the face glass and one of the lens elements, is provided with a light attenuation filter disposed at a position from the fluorescent layer to the lens element.

According to another feature of the present invention, the attenuation filter is disposed at a position within the transparent liquid layer between the face glass of the CRT and the lens element. More particularly, the light attenuation filter has a transmittance of 0.9 or less and preferably, in the range of 0.9 to 0.7.

Also, in accordance with a further feature of the present invention, the exit surface of the lens element is blackened at a portion thereof other than a nearly rectangular opening at the center of the lens element.

In accordance with the present invention, a light reflected in the exit plane of the lens element passes through the light attenuation filter and is returned to the CRT, but a light which becomes a useless light on the screen passes from the CRT through the light attenuation filter again and arrives at the screen. Therefore it follows that the useless light passes through the light attenuation filter two times and arrives at the screen after being attenuated sufficiently. Consequently, the contrast ratio of the image on the screen is significantly improved.

Also, according to the present invention, since the exit plane of the lens element is blackened in a predetermined portion thereof, a light from the CRT to the periphery of the lens element and subjected to total reflection is absorbed by the blackened portion of the lens element and is not returned to the fluorescent layer of the CRT. Consequently, the useless light is decreased and the contrast ratio of the image on the screen is significantly improved.

These and other objects, features, and advantages of the present invention will become more apparent from the following description when taken in conjunction with the accompanying drawings which show, for purposes of illustration only, several embodiments of the present invention.

DESCRIPTION OF THE PREFERRED EMBODIMENTS

Figure 1:
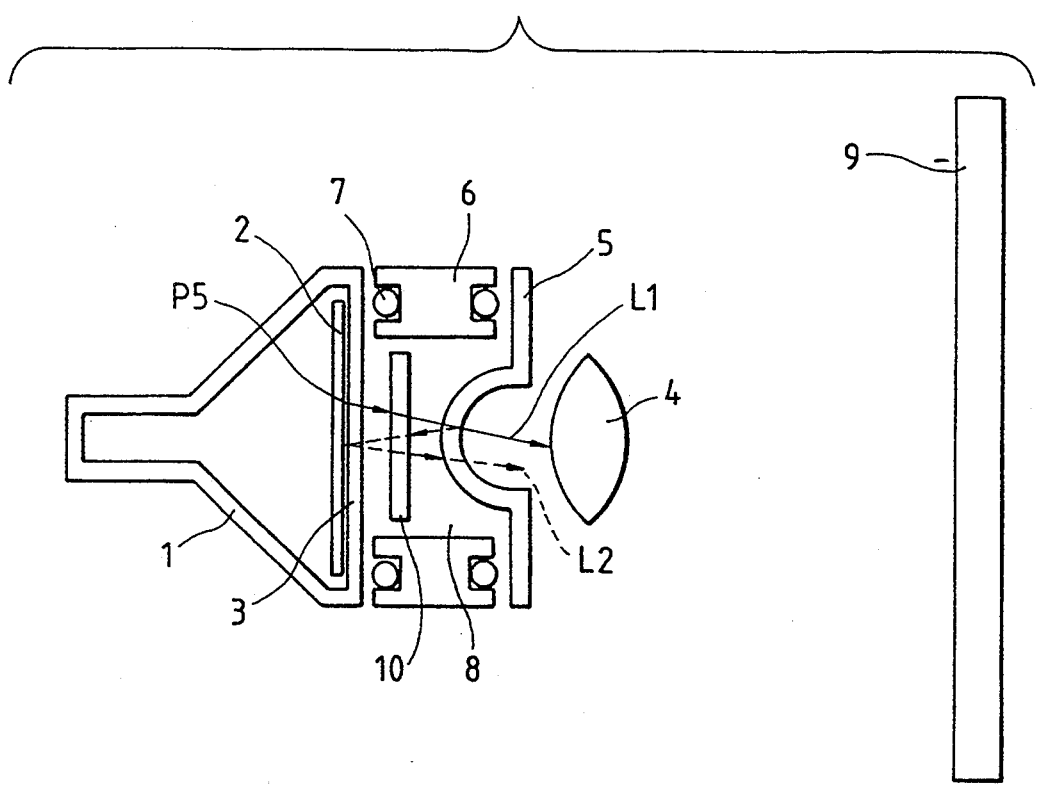
FIG. 1 shows an embodiment of a projection type display device according to the invention.

Referring now to the drawings where like reference numerals are utilized to designate like parts throughout the several views, FIG. 1 shows an embodiment of a projection type display device according to the present invention including a light attenuation filter 10. In FIG. 1, in a layer of a transparent liquid 8 charged within a space delimited by a liquid container 6, a face glass 3 of a CRT 1 and a lens element 5,the a light attenuation filter 10 of a plate shape is provided so as to extend perpendicularly with respect to the optical axis of the lens elements 4, 5. The light attenuation filter 10 is made of glass or plastic and has a refractive index which is nearly equal to that of the transparent liquid 8 and selected to be about 1.4–1.6.

According to the arrangement of FIG. 1, a light emitted from a position P5 on the fluorescent layer 2 passes through the light attenuation filter 10 and further passes through the lenses 5, 4 and arrives at the screen 9 as shown by the solid line arrow, but a portion of the light which is reflected on the exit plane of the lens element 5, because of the difference of refractive index between the lens element 5 and air, passes through the light attenuation filter 10 again and is returned to the fluorescent layer 2, is diffused and reflected and again passes through the light attenuation filter 10 as shown by the broken line arrow. In this case, the light passing as shown by the solid line arrow and arriving at the screen 9 is useful projection light L1 contributing to the image projection, and the light advancing as shown by the broken line arrow and arriving at the screen 9 is useless light L2 disturbing the image projection.

As above described, the useful projection light L1 passes through the filter 10 only once, whereas the useless light L2 passes through the light attenuation filter 10 three times including the first passage in the form of the solid line. Consequently, even though the useful projection light L1 is attenuated by the light attenuation filter 10, the useless light L2 is further attenuated in comparison with the useful projection light L1, and since the strength (light quantity) of the useless light L2 when reflected on the exit plane of the lens element 5 is quite small in comparison with the strength of the useful projection light L1, the influence of the useless light L2 on the projected image on the screen 9 becomes small.

The contrast ratio is defined as ratio of the useful projection light L1 to the useless light L2 on the screen 9. When the light attenuation filter 10 is not used, that is, if the strength of the useful projection light and the strength of the useless light in the prior art is made Do, Uo respectively, and the strength of the useful projection light and the strength of the useless light when using the light attenuation filter 10 is made D, U respectively, and the transmittance of the light attenuation filter 10 is made T ($<1$), since $$D = T \times Do;\text{ and}$$

$$U = T^3 \times Uo$$

the contrast ratio D/U in this embodiment becomes $$D/U = (1/T^2) \times (Do/Uo)$$

and becomes as large as $1/T^2$ (where $T>1$) times of the contrast ratio in the prior art. For example, if the transmittance T of the light attenuation filter 10 is selected to 0.7, the strength of the useful projection light is decreased to 70% in comparison with the prior art as above described but the contrast ratio is improved about two times ($=1/0.7^2$).

Judging from various evaluation tests and practical experience regarding a projection type display device in the past, a figure of merit of picture quality of a projected image on the screen appears to be approximately proportional to the product of the strength of the useful projection light and the contrast ratio. According to this embodiment of the present invention, since the strength of the useful projection light becomes T times and the contrast ratio becomes $1/T^2$ times in comparison with the prior art as above described, the figure of merit is improved to 1/T (more than 1) times. Here, the figure of merit in this embodiment is made 1.1 times or more in comparison with the above-mentioned prior art. Therefore, the transmittance T of the light attenuation filter 10 is made 0.9 or less. Consequently, the contrast ratio is made 1.2 times or more in comparison with the above-mentioned prior art.

In theory, if the transmittance T of the light attenuation filter 10 is made small, the contrast ratio or the figure of merit will be more improved. However, if the transmittance T is made too small, the strength of useful projection light L1 arriving at the screen 9 becomes too small, and the projection picture plane on the screen 9 becomes dark. Consequently, the transmittance T of the light attenuation filter 10 cannot be made too small, and is preferably made 0.7 or more.

Also in this embodiment, in a similar manner to the above-mentioned prior art, external light from the surrounding illumination source or the like is prevented from entering the CRT 1 by a separately provided cylindrical mount arrangement.

Figure 2:
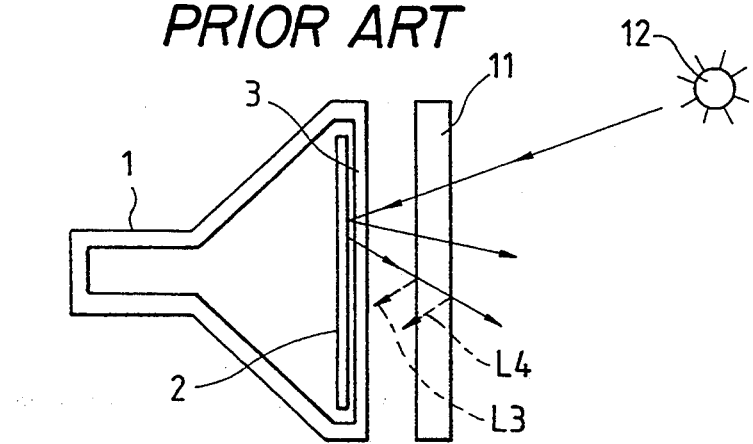
FIG. 2 shows an example of a direct view display device using a light attenuation filter.

As a method of preventing the external light, in a direct view display device as shown in FIG. 2, there is a method of installing a light attenuation filter 11 in front of a face glass 3. Light from a surrounding external light source 12 passes through the light attenuation filter 11. This becomes useless light, and if transmittance of the light attenuation filter 11 is made T, the useless light is attenuated to $1/T^2$ times and its influence is reduced. In the arrangement of FIG. 2, useful light emitted from the fluorescent layer 2 passes through the light attenuation filter 11 once so as to be multiplied by T whereas the useless light due to the surrounding external light passes through the light attenuation filter twice so as to be multiplied by $T^2$ as described above. Thereby, the contrast ratio $D/U=(1/T)\times Do/Uo$ and becomes $1/T$ times and is improved in comparison with the case that the light attenuation filter 11 is not installed. however, the figure of merit is $T\times 1/T=1$ and therefore the figure of merit is the same whether or not the light attenuation filter 11 is installed. That is, the figure of merit is not improved in such arrangement.

Since the light attenuation filter 11 is placed in the air and its refractive index is always different from that of the air, a portion of the useful light emitted from the fluorescent layer 2 is reflected in the incidence plane and the exit plane of the light attenuation filter 11 as shown by dotted lines L3, L4 in FIG. 2. Consequently, the strength of the actual useful light arriving at the eyes of an observer becomes smaller than the strength of the useful light emitted from the fluorescent layer 2, and corresponding to this, the contrast ratio is deteriorated and the figure of merit, in fact, becomes smaller than the case where the light attenuation filter 11 is not installed.

In contradistinction, in the embodiment as above described for a projection type display device as utilized in FIG. 1, since the light attenuation filter 10 is installed in the transparent liquid layer 8 having nearly the same refractive index as that of the light attenuation filter 10, the useful projection light L1 is not reflected by the light attenuation filter 10 and both the contrast ratio and the figure of merit are improved, and a good image is displayed on the screen 9 so that even display and decipherment of time become very easy.

In FIG. 1, the light attenuation filter 10 is supported in the transparent liquid layer 8 by a support (not shown). However, the light attenuation filter 10 may be bonded and fixed to the face glass 3 of the CRT 1. Alternatively, the light attenuation filter 10 may be formed as part of the fluorescent layer 2.

Also in a projection type display device where color images are projected on the screen using three projection CRTs corresponding to images of three primary colors (red, green, blue) respectively, although a light attenuation filter 10 is installed in each CRT, respective light attenuation filters 10 may be colored to corresponding primary colors. Thereby, not only the contrast ratio, but also the color purity is improved.

Figure 3:
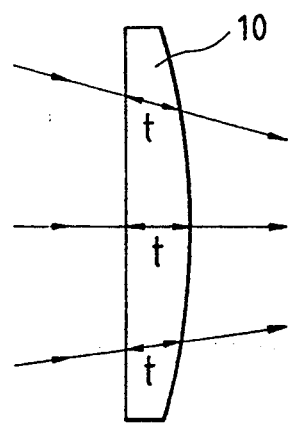
FIG. 3 is a sectional view of a light attenuation filter in FIG. 1.

As shown in FIG. 3, the thickness of the light attenuation filter 10 is reduced or thinned in the peripheral part of the filter 10, and the optical path travelled by different light rays can be made uniform corresponding substantially to the thickness T. Thereby the action of the light attenuation filter 10 can be made uniform throughout the whole domain of the picture plane.

Figure 4A:
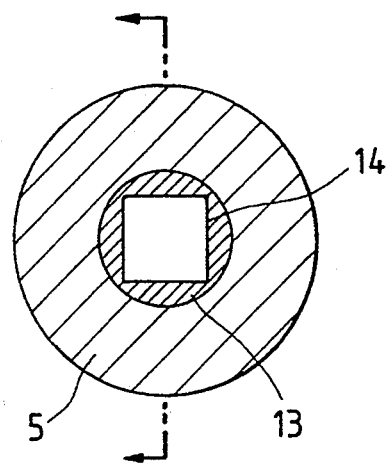
FIGS. 4(a) and 4(b) show a plan view and sectional view, respectively, of a lens element in another embodiment of a projection type display device according to the invention.
Figure 4B:
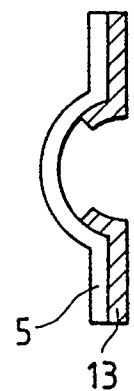

FIGS. 4(a) and 4(b) show a lens element 5 according to another embodiment of a projection type display device of the present invention wherein FIG. 4(a) is a plan view and FIG. 4(b) is a sectional view taken in sectional line 4b—4b of FIG. 4(a). The lens element 5 is provided with a blackened portion 13 for absorbing light and reference numeral 14 designates a transmission domain of the lens element.

In general, the contour shape of a display image of a projection type display device (i.e., contour shape of the image on the CRT) is not circular but rectangular. Therefore, in this embodiment, as shown in FIG. 4(a), a rectangular domain about the center axis of the lens element 5 is made a transmission domain 14, and other than the transmission domain 14, a blackened portion 13 is provided on the surface of the lens element 5. The other features of the projection type display device are similar to those shown in FIG. 1.

Figure 5:
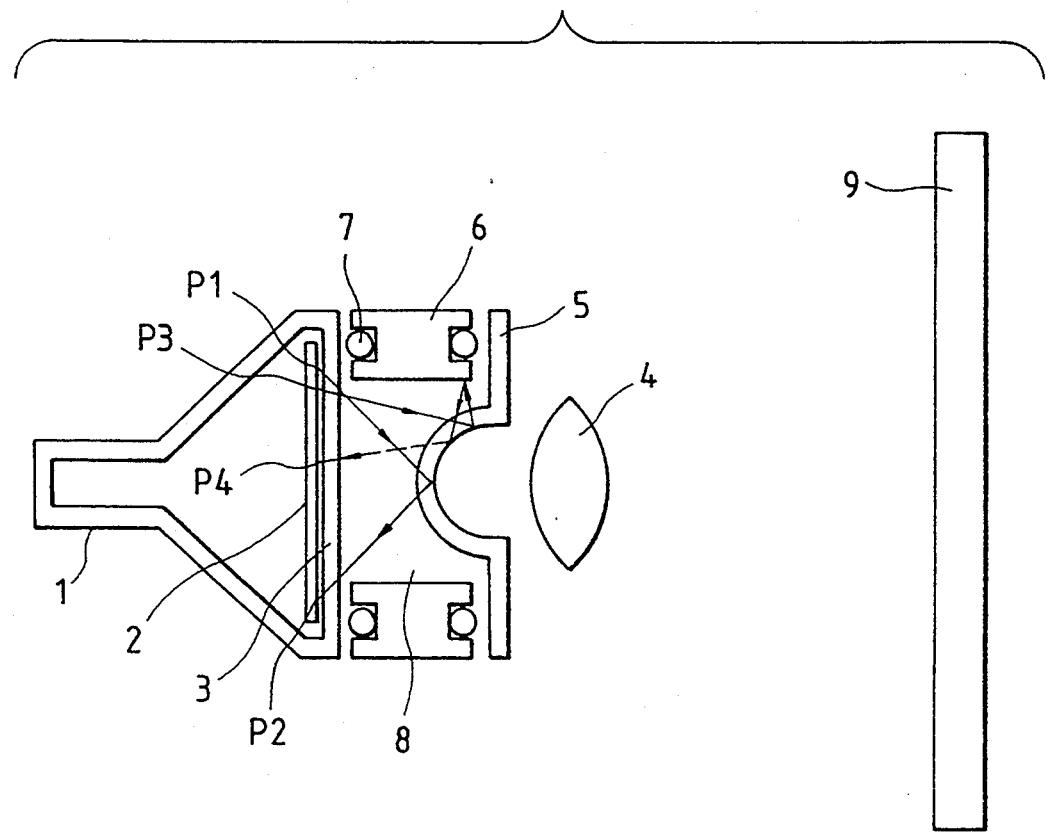
FIG. 5 shows a prior art projection type display device.
Figure 6:
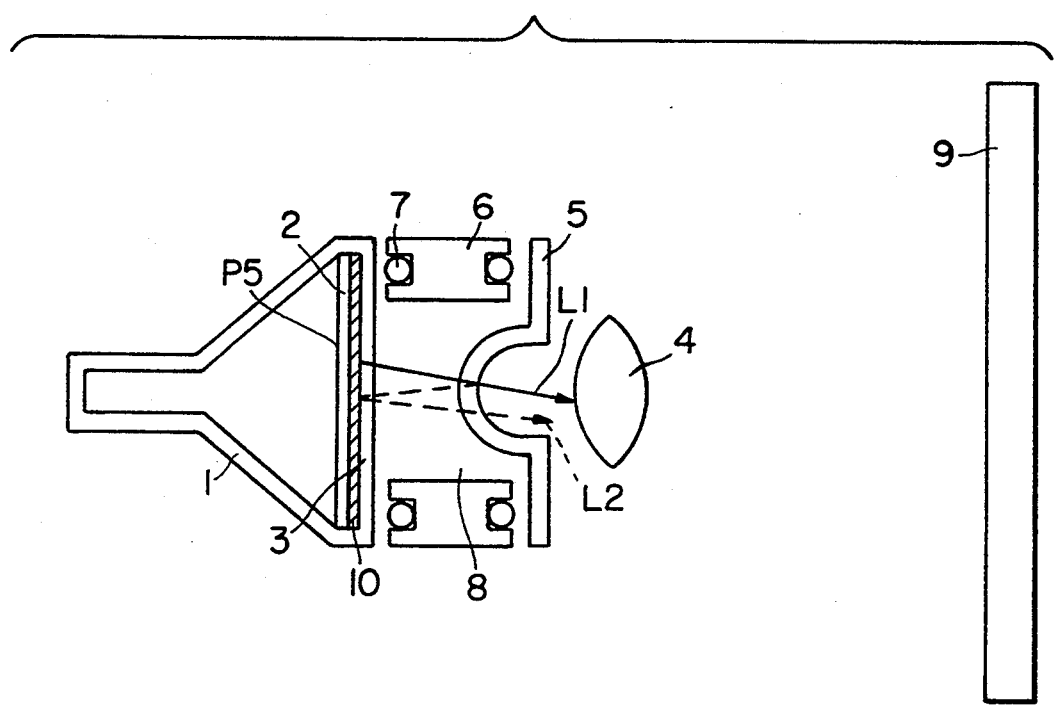
FIG. 6 shows another embodiment of a projection type display device according to the invention.

In a peripheral part of the lens element 5, even a light emitted from the fluorescent layer 2 of the CRT 1 (FIG. 1) becomes useless light due to the total reflection and the blackened portion 13 is provided so as to absorb such useless light efficiently. In this case, it is needless to say that the transmission domain 14 is set so as to transmit the useful projection light contributing to the image projection at the screen 9 efficiently well. Thereby, returning light to the fluorescent layer 2, due to such total reflection as shown in FIG. 5, can be significantly attenuated, and further improvement of the contrast ratio can be attained. The blackened portion 13 may be obtained by applying black paint or a black adhesive tape, for example, to the lens element 5 in the configuration illustrated.

According to the present invention, an image with both the contrast ratio and the figure of merit being significantly improved can be displayed on the screen. Further, the color purity is improved and the color reproducing range is enlarged significantly.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A projection type display device comprising a CRT with a fluorescent layer and a face glass, the CRT projecting an image formed on the fluorescent layer through the face glass, a transparent liquid, and at least one lens element to a screen, the transparent liquid being filled within a space between the face glass of the CRT and the at least one lens element and having a refractive index substantially the same as a reflective index of the face glass of the CRT and the at least one lens element, and a light attenuation filter having a transmittance no greater than 0.9 being disposed at a position from at least a part of the fluorescent layer to the at least one lens element, the CRT projecting the image through the light attenuation filter, the light attenuation filter being configured so as to be thicker at a center portion thereof than at a peripheral portion so that optical paths of the image projected therethrough are substantially equal.

2. A projection type display device according to claim 1, wherein the light attenuation filter is disposed in the transparent liquid so that the image is projected therethrough.

3. A projection type display device according to claim 2, wherein the light attenuation filter has a transmittance in the range of 0.9 to 0.7.

4. A projection type display device according to claim 2, wherein the light attenuation filter has a refractive index substantially the same as the refractive index of the transparent liquid.

5. A projection type display device according to claim 2, wherein the light attenuation filter is a colored filter.

6. A projection type display device according to claim 2, wherein the light attenuation filter is bonded to the face glass of the CRT.

7. A projection type display device according to claim 1, wherein the at least one lens element is provided with a blackened portion at an exit plane thereof other than at a substantially rectangular opening at a center of the exit plane of the at least one lens element.

8. A projection type display device according to claim 3, wherein the light attenuation filter has a refractive index substantially the same as the refractive index of the transparent liquid.

9. A projection type display device according to claim 3, wherein the light attenuation filter is a colored filter.

10. A projection type display device according to claim 3, wherein the light attenuation filter is bonded to the face glass of the CRT.

11. A projection type display device according to claim 1, wherein the light attenuation filter is bonded to the face glass of the CRT.

12. A projection type display device according to claim 8, wherein the light attenuation filter is a colored filter.

13. A projection type display device according to claim 12, wherein the light attenuation filter is bonded to the face glass of the CRT.

14. A projection type display device according to claim 1, wherein the light attenuation filter is formed as part of the fluorescent layer.

15. A projection type display device according to claim 14, wherein the light attenuation filter is bonded to an inner surface of the face glass.

16. A projection type display device according to claim 1, wherein the light attenuation filter has a transmittance in the range of 0.9 to 0.7.

17. A projection type display device according to claim 16, wherein the light attenuation filter is formed as part of the fluorescent layer.

18. A projection type display device accordance to claim 1, wherein the light attenuation filter is a colored filter.

19. A projection type display device according to claim 18, wherein the light attenuation filter is formed as part of the fluorescent layer.

20. A projection type display device comprising a CRT with a fluorescent layer and a face glass, the CRT projecting an image formed on the fluorescent layer through the face glass, a transparent liquid, and at least one lens element to a screen, the transparent liquid being filled within a space between the face glass of the CRT and the at least one lens element and having a refractive index of substantially the same as a refractive index of the face glass of the CRT and the at least one lens element, and a light attenuation filter having a transmittance no greater than 0.9, the light attenuation filter being formed as part of the fluorescent layer.

21. A projection type display device according to claim 20, wherein the light attenuation filter formed as part of the fluorescent layer is bonded to an inner surface of the face glass of the CRT.

* * * * *